United States Patent
McGuire et al.

(10) Patent No.: US 7,497,326 B2
(45) Date of Patent: Mar. 3, 2009

(54) PIVOTABLE SUPPORT FOR A CONVEYOR AND METHOD OF REPLACING A DAMAGED CONVEYOR BELT

(75) Inventors: Patrick McGuire, Trophy Club, TX (US); David Upchurch, Godley, TX (US); Donald K. Wier, Mansfield, TX (US)

(73) Assignee: Transnorm System, Inc., Arlington, TX (US)

( * ) Notice: Subject to any disclaimer, the term of this patent is extended or adjusted under 35 U.S.C. 154(b) by 315 days.

(21) Appl. No.: 11/504,210

(22) Filed: Aug. 15, 2006

(65) Prior Publication Data

US 2008/0041702 A1    Feb. 21, 2008

(51) Int. Cl.
    *B65G 21/00* (2006.01)
(52) U.S. Cl. ............... 198/861.1; 198/831; 198/860.1
(58) Field of Classification Search .............. 198/831, 198/860.1, 861.1, 813
    See application file for complete search history.

(56) References Cited

U.S. PATENT DOCUMENTS

| RE24,319 | E | 5/1957 | McLaughlin | |
|---|---|---|---|---|
| 3,455,256 | A | 7/1969 | Prager | |
| 4,715,488 | A | 12/1987 | Hewitt et al. | |
| 4,846,338 | A * | 7/1989 | Widmer | 198/831 |
| 5,022,514 | A * | 6/1991 | Lofberg | 198/861.3 |
| 5,857,559 | A | 1/1999 | Gianvito et al. | |
| 6,044,960 | A * | 4/2000 | Cloud et al. | 198/841 |
| 6,281,478 | B2 * | 8/2001 | Chandler et al. | 198/861.1 |
| 6,681,923 | B2 * | 1/2004 | Jader | 198/861.1 |

* cited by examiner

Primary Examiner—James R Bidwell
(74) Attorney, Agent, or Firm—Kenneth F. Pearce

(57) ABSTRACT

The present invention is related to the replacement of a damaged conveyor belt. Opening the pivotable support associated with the conveyor's leg allows the damaged conveyor belt to be removed from the conveyor without dismantling numerous sections of the belt holder.

15 Claims, 9 Drawing Sheets

PIVOTABLE SUPPORT FOR A CONVEYOR AND METHOD OF REPLACING A DAMAGED CONVEYOR BELT

BACKGROUND OF THE INVENTION

1. Field of the Invention

Among other things, the present invention is related to the replacement of a damaged conveyor belt. Without the dismantling of numerous sections of the conveyor frame and belt holder, a damaged conveyor belt can be replaced. The current pivotable support is associated with an upper section of a conveyor frame and can be opened and securely closed.

2. Description of the Previous Art

1) U.S. Pat. No. 5,857,559-Gianvito, et al. enables a sliding belt turn conveyor. Column 5 reads, "In order to replace belt 12, a single member, plate 40, is removed, which allows the wheel assemblies 46 and 47 to be separated from the support brackets 28 so that the belt 12 may be slid to the right as viewed in FIGS. 2-4 and thereby removed from the belt turn conveyor for replacement. The same procedure is followed in reverse in order to apply a new belt to the assembly." The Gianvito Patent is silent regarding any pivotable support associated with a conveyor frame that can be utilized for conveyor belt replacement.

2) U.S. Pat. No. 4,715,488-Hewitt, et al. enables a collapsible conveyor. Column 3 reads, "As best shown in FIG. 4, the locking means 40 comprises a plate 42 pivotally secured on the side of the hollow leg member 22 adjacent to the inclined surface 32. The hinge 44 permits the plate 42 to pivot from a substantially vertical position toward a position extending into the chamber of the hollow leg member 22 at an angle similar to the angle at which the surface 32 is inclined with respect to the leg surface 34 of the upper leg member 24. Pivoting of the plate 42 is controlled by a rotatably locking member 46 preferably, in the form of a bolt with an enlarged head." The Hewitt Patent is silent regarding any pivotable support associated with a conveyor frame that can be utilized for conveyor belt replacement.

3) U.S. Pat. No. 3,455,256-Prager enables an adjustable support for tables. Column 2 reads, "Adjustable support 6 may be stored along the underside of table 8 by collapsing adjustable support 6 to pivot toward table 8 on pivots 14. FIG. 3 shows the support in the storage position." The Prager Patent is silent regarding any pivotable support associated with a conveyor frame that can be utilized for conveyor belt replacement.

4) U.S. Pat. RE 24,319-McLaughlin enables a gravity converter section of a conveyor. Column 2 reads, "The supports C are telescopic so as to enable the bed to be raised to the desired elevation and degree of inclination. For example . . . where the section is used to divert packages from a conveyor belt . . . . The other end of the section B is lowered below the level of the diverter end so that the packages will move by gravity to their destination." The McLaughlin Patent is silent regarding any pivotable support associated with a conveyor frame that can be utilized for conveyor belt replacement.

SUMMARY OF THE INVENTION

Traditionally, two types of conveying belts were generally utilized in the art. A first type of conveyor belt is held together by a rod and coupler combination. When the rod and coupler combination is released, the first and second connected transverse edges of the conveyor belt are pulled apart to remove the conveyor belt from the conveyor frame.

The second kind of belt is a seamless one-piece conveyor belt. This type of belt does not utilize a rod and coupler combination. Moreover, for the seamless one-piece conveyor belt, the transverse seam associated with the abutting of the first and second edges of the conveyor belt is not exposed on the outward surface of the conveyor belt. Prior to the current invention, dismantling of the conveyor frame was required to remove the damaged seamless one-piece conveyor belt.

Applicants believe their pivotable connector to be the first of its kind for the conveying arts. Without dismantling the conveyor frame, the present pivotable connector allows a seamless one-piece conveyor belt to be removed from a conveyor. The current invention is associated with a superior section of a conveyor frame. Releasing the invention's fastener allows the pivotable connector to be pivoted to a temporarily open position. With the pivotable connector in the open position, the damaged conveyor belt can be removed from the conveyor and the replacement belt fitted onto the conveyor. Thus, the present invention meets the long felt but previously unfilled need of providing for the replacement of a damaged conveyor belt without dismantling the conveyor frame.

An aspect of the present invention is to enable a method for allowing a replacement conveyor belt to be fitted to a conveyor without the necessity of dismantling the conveyor frame.

Still another aspect of the present invention is to provide a support or link for a superior section of a conveyor frame.

It is another aspect of the present invention to provide a pivotable connector for a conveyor frame's leg.

Yet another aspect of the present invention is to provide a support or link that can be retrofitted to existing conveyors.

Still another aspect of the present invention is to provide a support or link for that can be utilized with either a straight or a curved conveyor frame.

It is yet another aspect of the present invention to lessen the amount of time associated with replacing a seamless one-piece conveyor belt.

An embodiment of the present invention can be described as a curved conveyor, comprising: a plurality of legs; an outward curved member; an inward curved member; a plurality of cross members extending between the outward curved member and the inward curved member; the plurality of cross members further including upper and lower cross members; one or more pivotable links located between the upper and lower cross members, wherein each pivotable link further comprises: a hub member, including an axle, mounted to a first cross member proximate the inward curved member; a support connected with the axle; and a securing member mounted to a second cross member proximate the inward curved member; a drive; and an endless conveyor belt.

Another embodiment of the present apparatus can be described as a pivotable support for a conveyor frame allowing easier removal of a damaged conveyor belt and positioning of a replacement conveyor belt about the conveyor frame, comprising: a first plate mounted to the conveyor frame; the first plate further comprising a shoulder; a second plate mounted to the conveyor frame; the second plate further comprising a hinge; and a connector pivotable about the hinge and capable of extending into the shoulder.

Yet another embodiment of the present invention can be described as a method of replacing a damaged seamless one-piece conveyor belt, comprising the steps of: releasing one or more pivotable connectors; rotating one or more of the pivotable connectors to create one or more temporary openings; removing the seamless one-piece damaged conveyor belt through the one or more temporary openings and away from the conveyor frame; inserting a replacement seamless one-piece conveyor belt through the one or more temporary openings; positioning the seamless one-piece replacement conveyor belt about the conveyor frame; and rotating one or more pivotable connectors to close one or more of the temporary openings.

In still another embodiment, the present invention can be described as a pivotable link for a conveyor frame allowing easier removal of a damaged conveyor belt and positioning of a replacement conveyor belt about the conveyor frame, comprising: a holder mounted to a superior section of the conveyor frame; a hinge mounted to the superior section; and a connector pivotable about the hinge.

It is the novel and unique interaction of these simple elements which creates the apparatus and methods, within the ambit of the present invention. Pursuant to Title 35 of the United States Code, descriptions of preferred embodiments follow. However, it is to be understood that the best mode descriptions do not limit the scope of the present invention.

DESCRIPTION OF THE PREFERRED EMBODIMENTS

Although the disclosure hereof is detailed to enable those skilled in the art to practice the invention, the embodiments published herein merely exemplify the present invention.

The current pivotable connector is particularly useful in the replacement of a damaged seamless one-piece conveyor belt that circulates about either a straight or curved conveyor. In the most general sense, the present invention can form a part or support for an upper section of a conveyor frame. By releasing the invention's fastener, the pivotable connector can be pivoted to an open position. The open position allows the damaged conveyor belt to be removed from the conveyor and the replacement conveyor belt to be positioned about the conveyor. After the replacement belt is positioned about the conveyor, the connector is pivoted into its shoulder, and the fastener securely holds the pivotable connector in its shoulder to stabilize the conveyor frame. Components of the support are composed of any materials acceptable in the art capable of bearing the loads carried by the conveyor.

Figure 1:
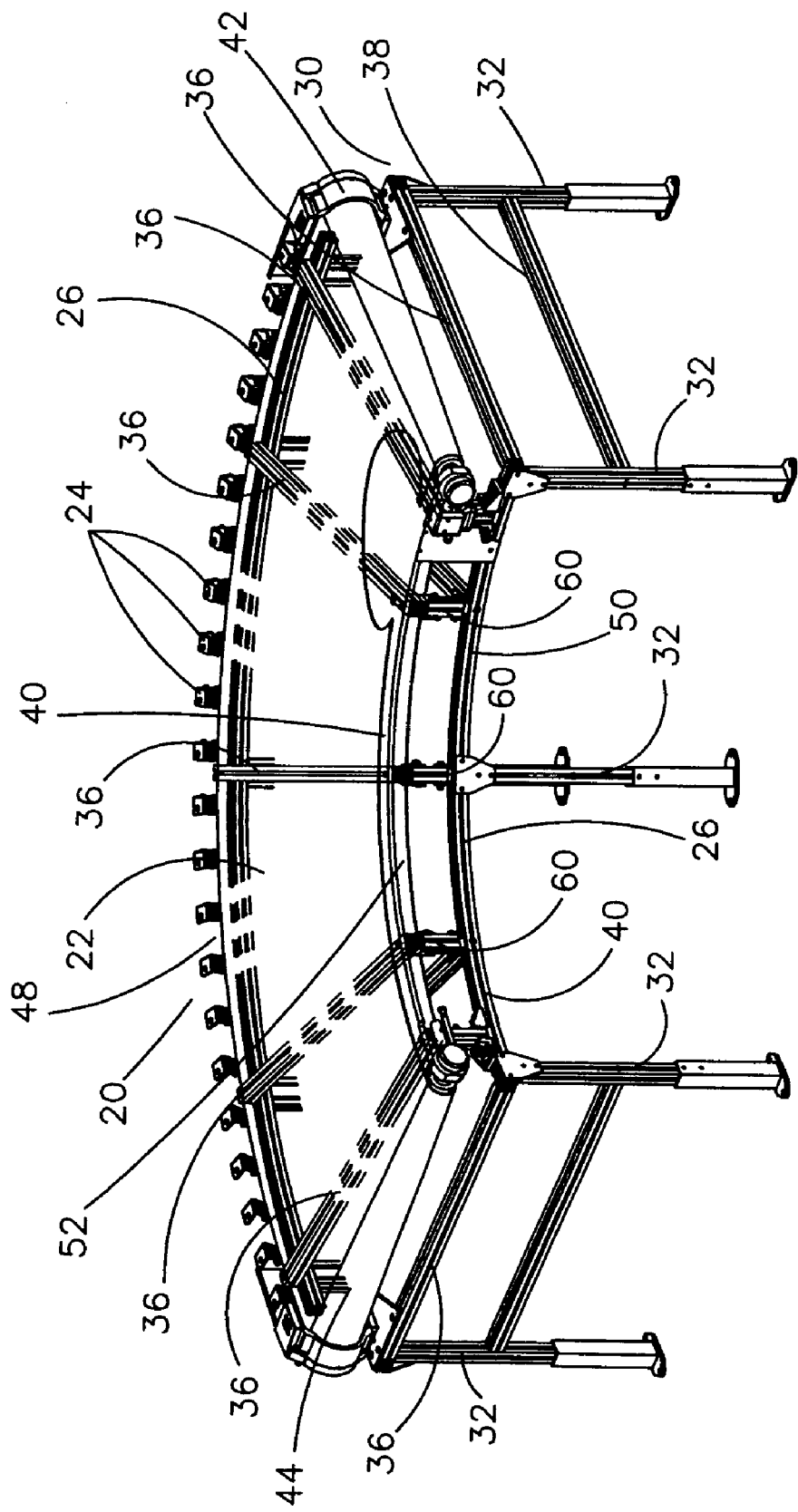
FIG. 1 is a perspective of a conveyor, within the scope of the present invention.

FIG. 1 is a perspective of conveyor (20). Belt (22) is held by grippers (24) and circulates about conveyor bed (40). Drive (42), roll (44) and belt grippers (24) are supported by upper section (26) of conveyor (20). Upper or superior section (26) of conveyor (20) is supported by legs (32). Extending between legs (32) are cross members (36), (38). Inward curved member (46), outward curved member (48) and cross members (36) create upper section (26) of conveyor (20). Inward curved member (46) has upper element (50) and lower element (52). Although not shown in FIG. 1, outward curved member also has upper and lower elements.

Links or supports (60) are generally located between upper and lower elements of upper section (26) of conveyor (20). In select embodiments, supports (60) can be a section of leg (32). As shown, supports (60) are manufactured of metal, specifically Aluminum. However, other compositions acceptable in the art can be used to manufacture supports within the scope of the present invention. Examples of other materials used to manufacture the current supports are steel and cast iron.

Figure 2:
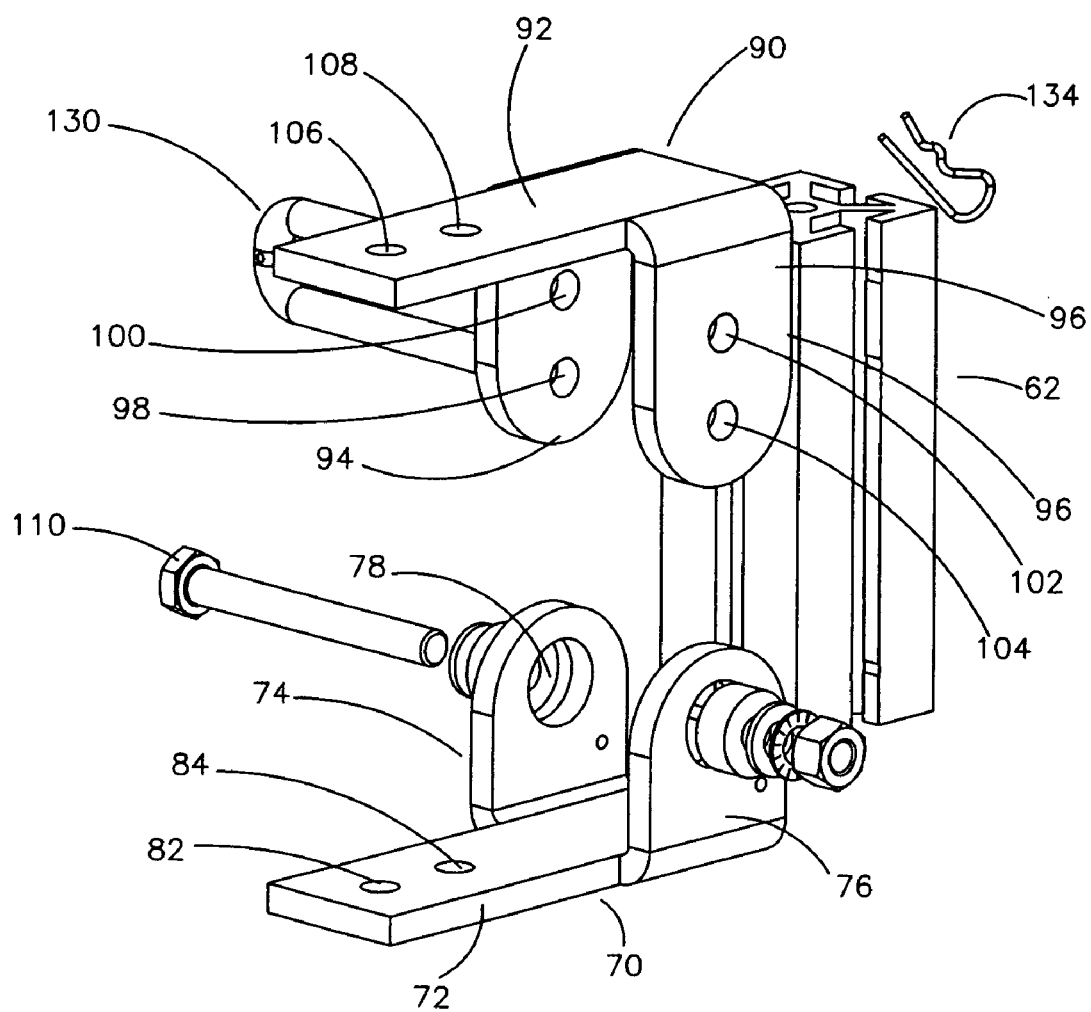
FIG. 2 is an exploded perspective of a support, within the scope of the present invention.

FIG. 2 is an exploded perspective of support (60). Connector (62) can be secured between hub or hinge (70) and holder (90). Extending from plate (72) of hub (70) are arms (74) and (76) that are provided with apertures (78) and (80, not shown in this view). Plate (72) includes apertures (82) and (84) allowing hinge (70) to be connected to a cross member or other part of frame (30). Hubs (70) are attached to cross member in any manner acceptable in the art. Bolt (110) and spacer, washer and nut combinations can be used to secure connector (62) to hub (70).

Depending from plate (92) of holder (90) are members (94) and (96) that create a shoulder for holding connector (62). Shoulder member (94) is provided with apertures (98) and (100) and shoulder member (96) has apertures (102) and (104). Plate (92) includes apertures (106) and (108) that can be used to attach holder (90) to a cross member or other part of frame (30). Holders (90) are attached to cross members in any manner acceptable in the art.

Figure 3:
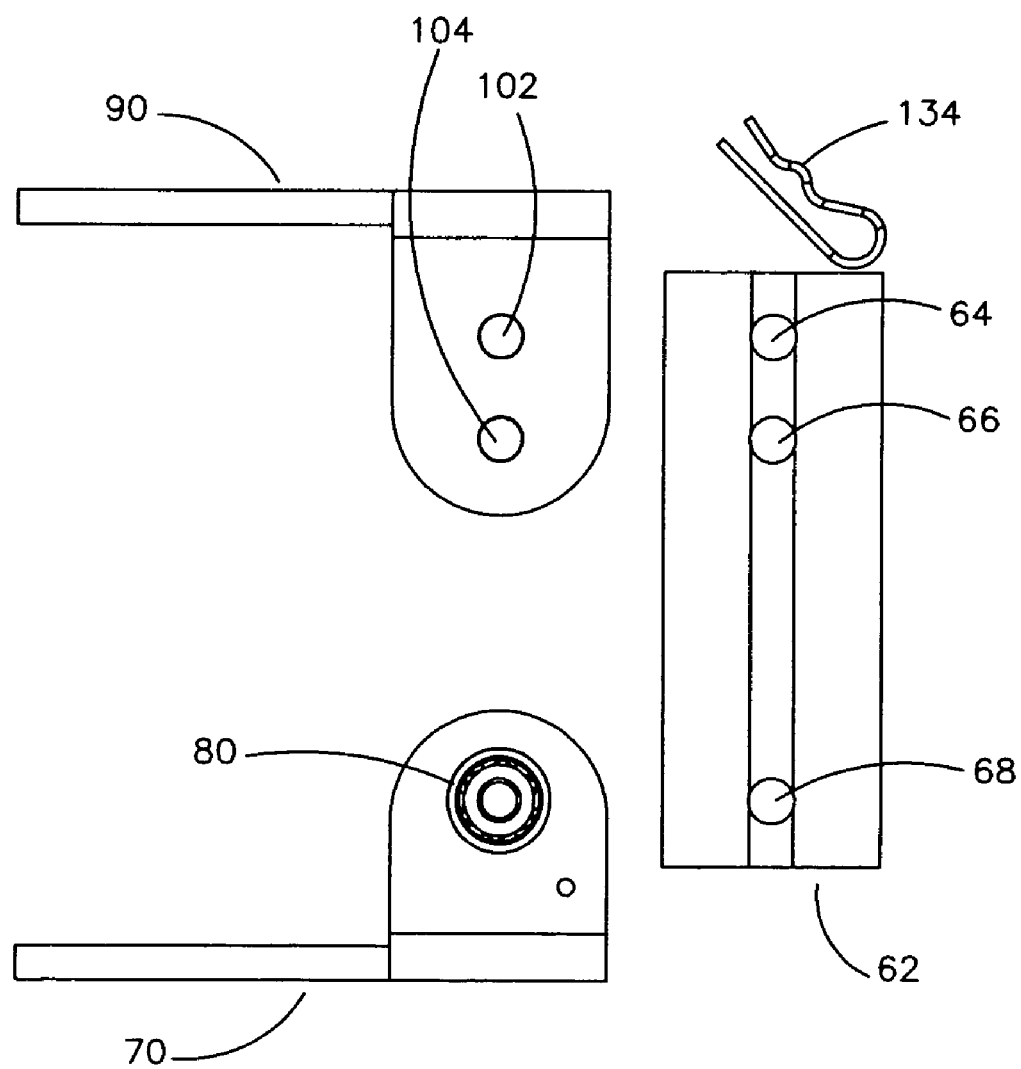
FIG. 3 is an exploded side view of a support, within the scope of the present invention.
Figure 4:
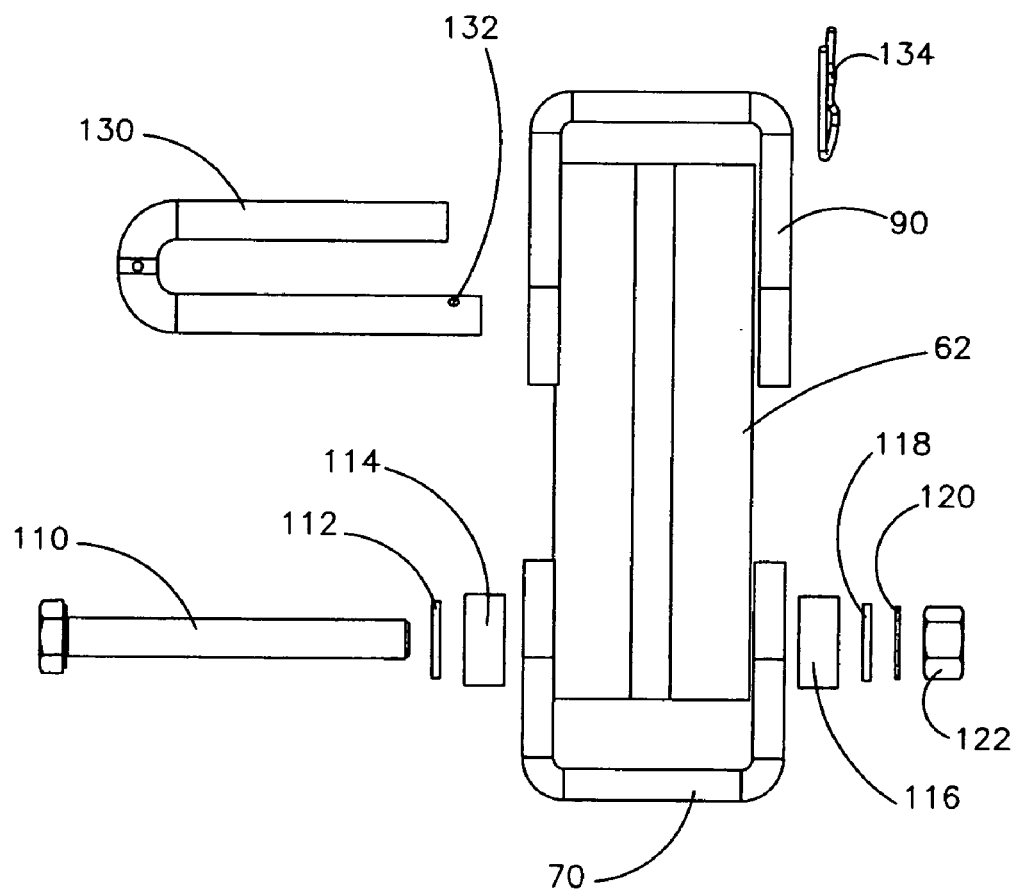
FIG. 4 is an exploded frontal view of a support, within the scope of the present invention.

FIG. 3 is an exploded side view of support (60) and FIG. 4 is an exploded frontal view of support (60). With reference to FIGS. 2-4, connector (62) is provided with bores (64), (66) and (68). Bolt (110) and bore (68) can be used to secure connector (62) to hub (70). After securing connector (62) to axle (110) of hub (70), connector (62) is pivotable in the direction transverse of bolt (110). As shown, the spacer, washer and nut combination utilized to secure bolt (110) includes washer (112), spacer (114), spacer (116), washer (118), washer (120) and nut (122). However, axle (110) can be secured to hub (70) in any manner acceptable in the art. After pivoting connector (62) into holder (90), pin (130) having hole (132) and clip (134) are used to fasten connector (62) within holder (90). As shown, pin (130) is a U-bolt, but other devices having other structures can also be utilized to secure pivotable connector (62) within shoulder (90).

Figure 5:
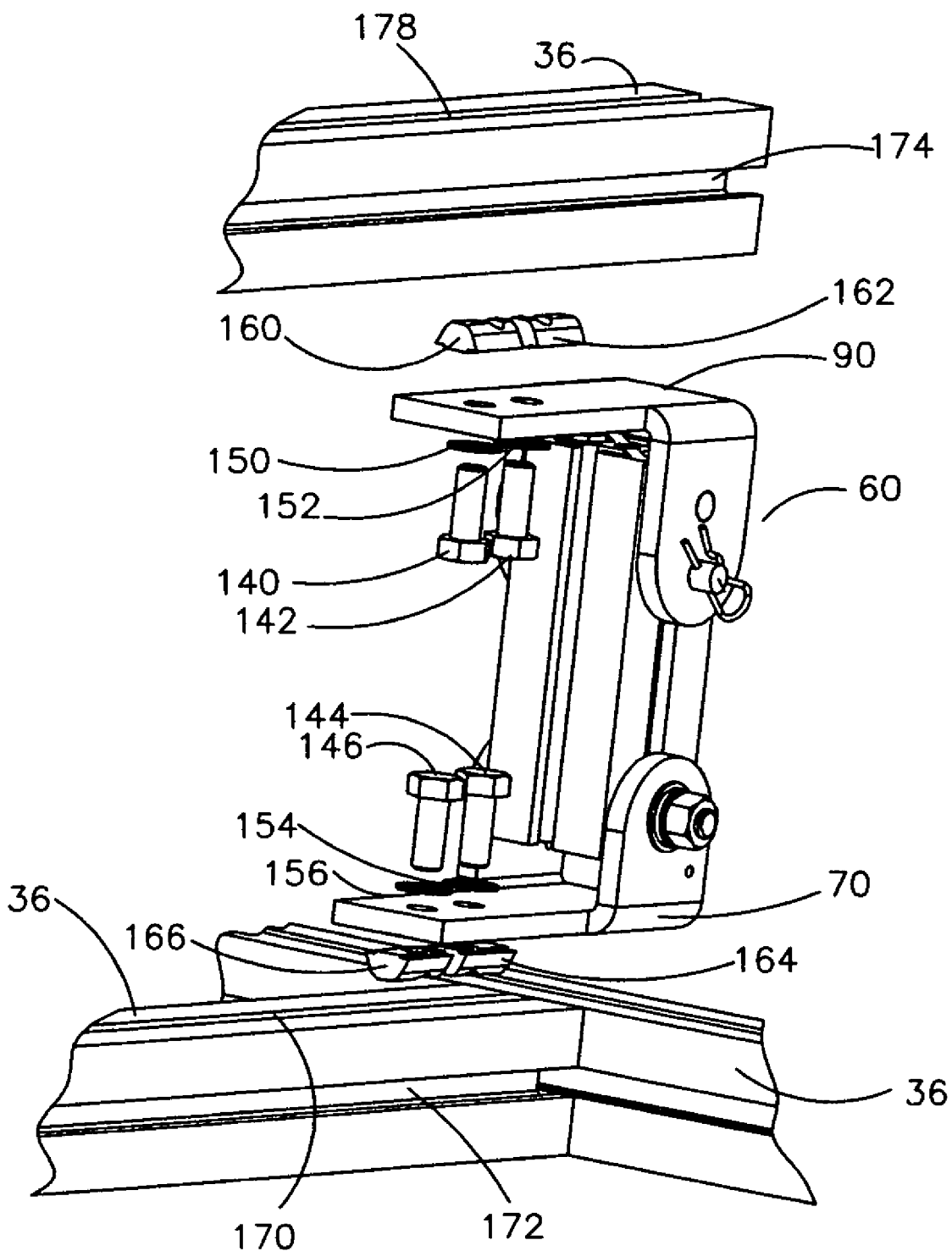
FIG. 5 is an exploded view of a secured support positioned between cross members of the conveyor and upper and lower sections of the conveyor legs, within the scope of the present invention.

FIG. 5 is an exploded view of a secured support (60) positioned between cross members (36) of the conveyor (20). Bolts (140, 142, 144 and 146), washers (150, 152, 154 and 156) and nuts (160, 162, 164 and 166) attach plates (70 and 90) to cross members (36) having apertures (170, 172, 174, 178).

Figure 6:
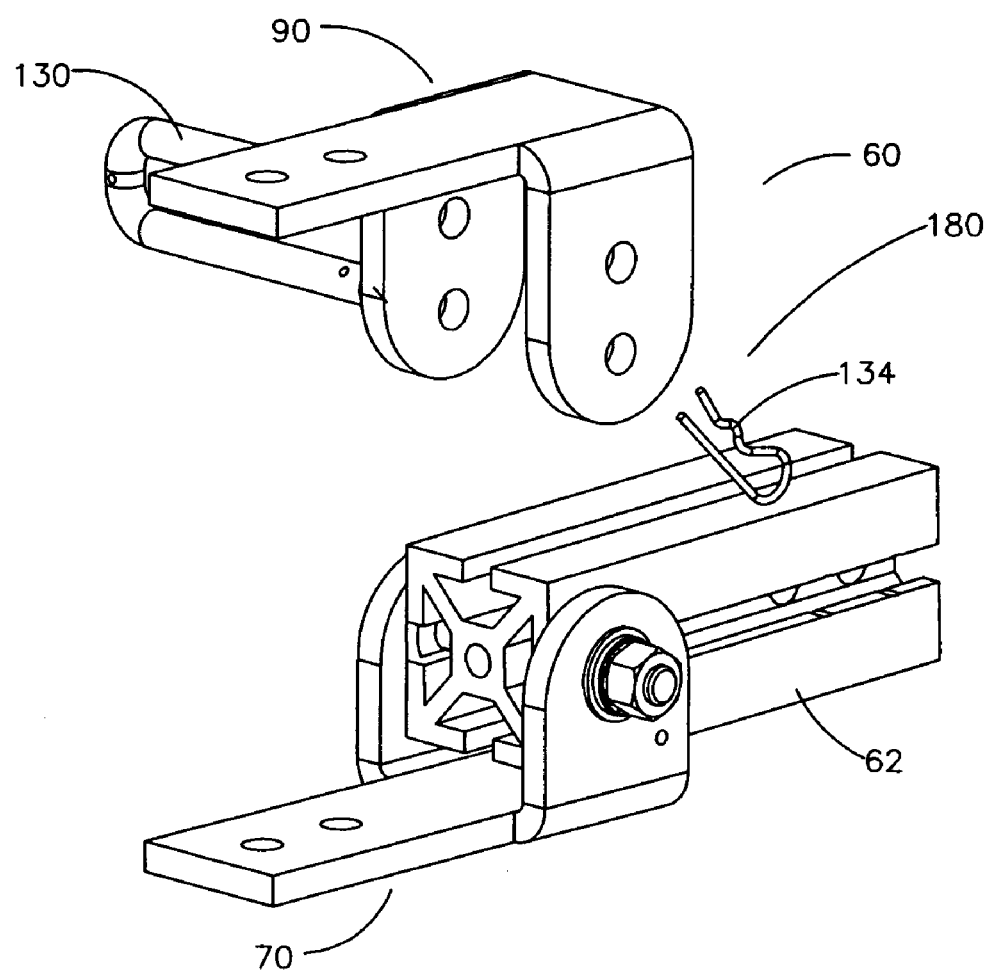
FIG. 6 is close up perspective of an open support, within the scope of the present invention.

FIG. 6 is close up perspective of an open support (60) where the cross members of the conveyor are not portrayed. After removal of pin (130), connector (62) is pivoted about hinge (70) and away from securing member (90). As shown, open support (60) allows a damaged conveyor belt to be removed from the conveyor and a replacement conveyor belt to be inserted through opening (180). When the replacement belt has been inserted through opening, connector (62) is pivoted about hub (70) and into holder (90). Thereafter, connector can be secured with a fastener, e.g., clip (134) and pin (130).

Figure 7:
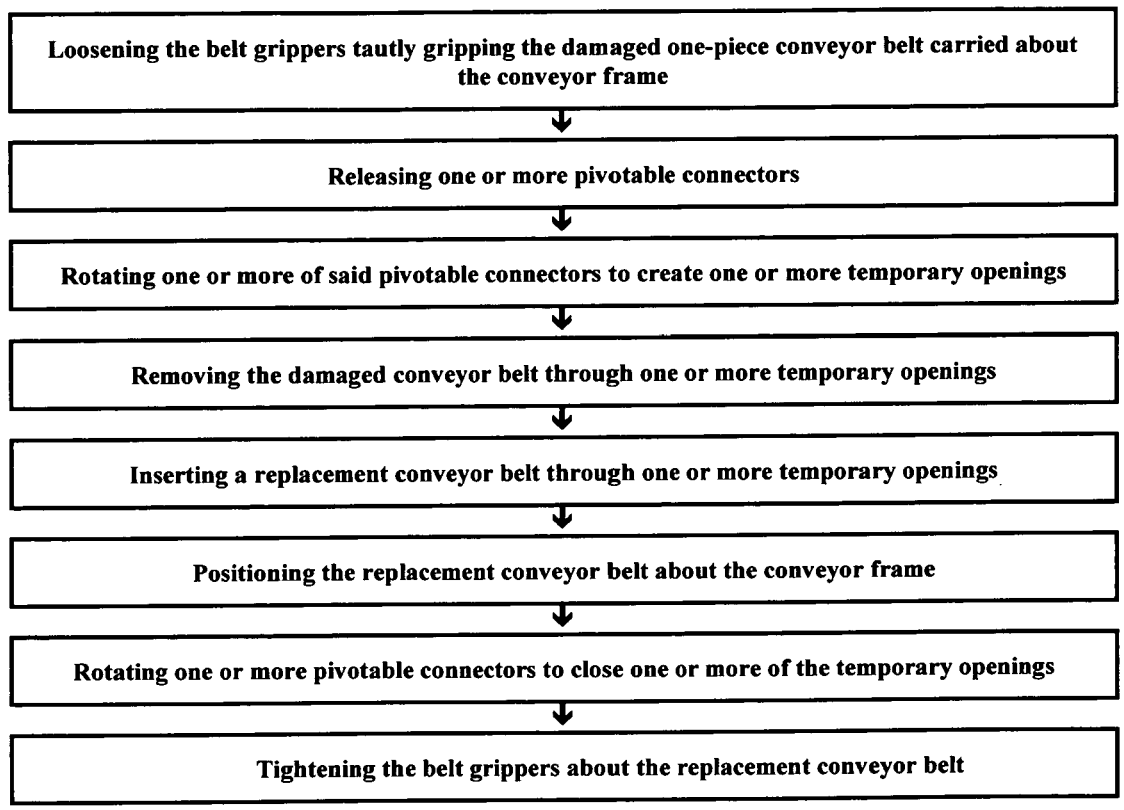
FIG. 7 is an exemplification of the steps an embodiment of the current method.
Figure 8:
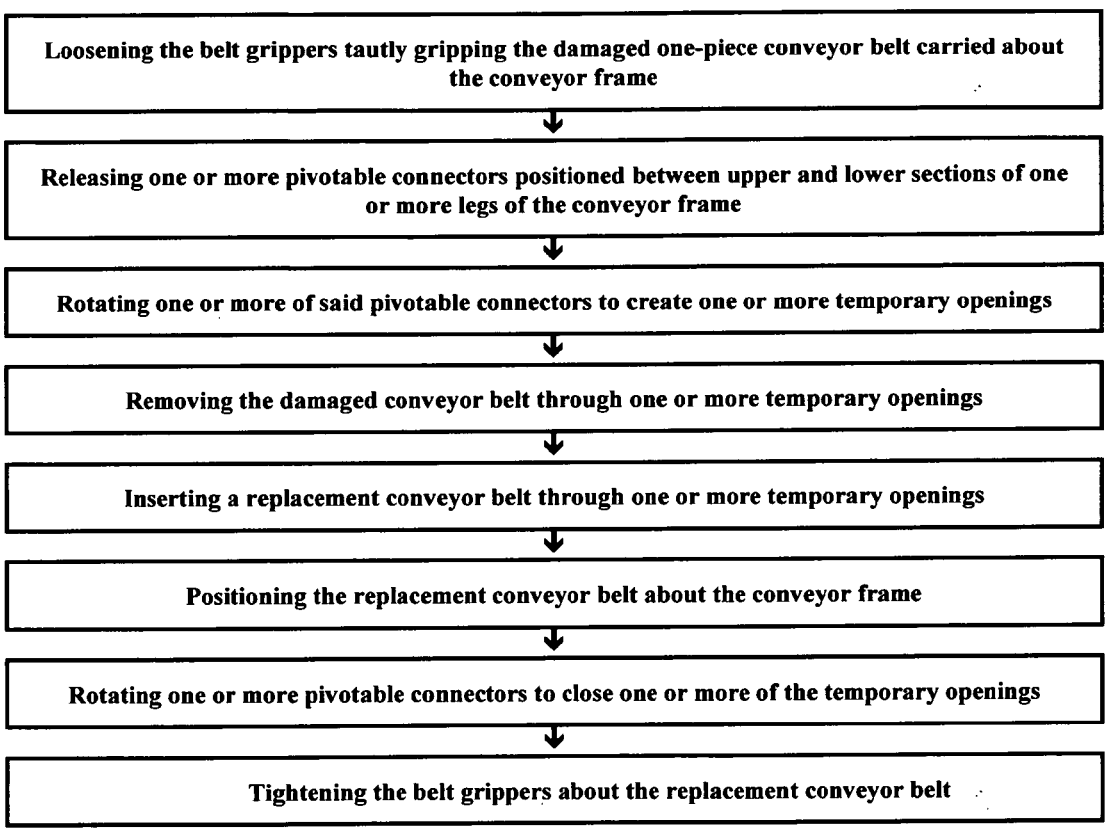
FIG. 8 is a depictions of the steps another embodiment of the current method.
Figure 9:
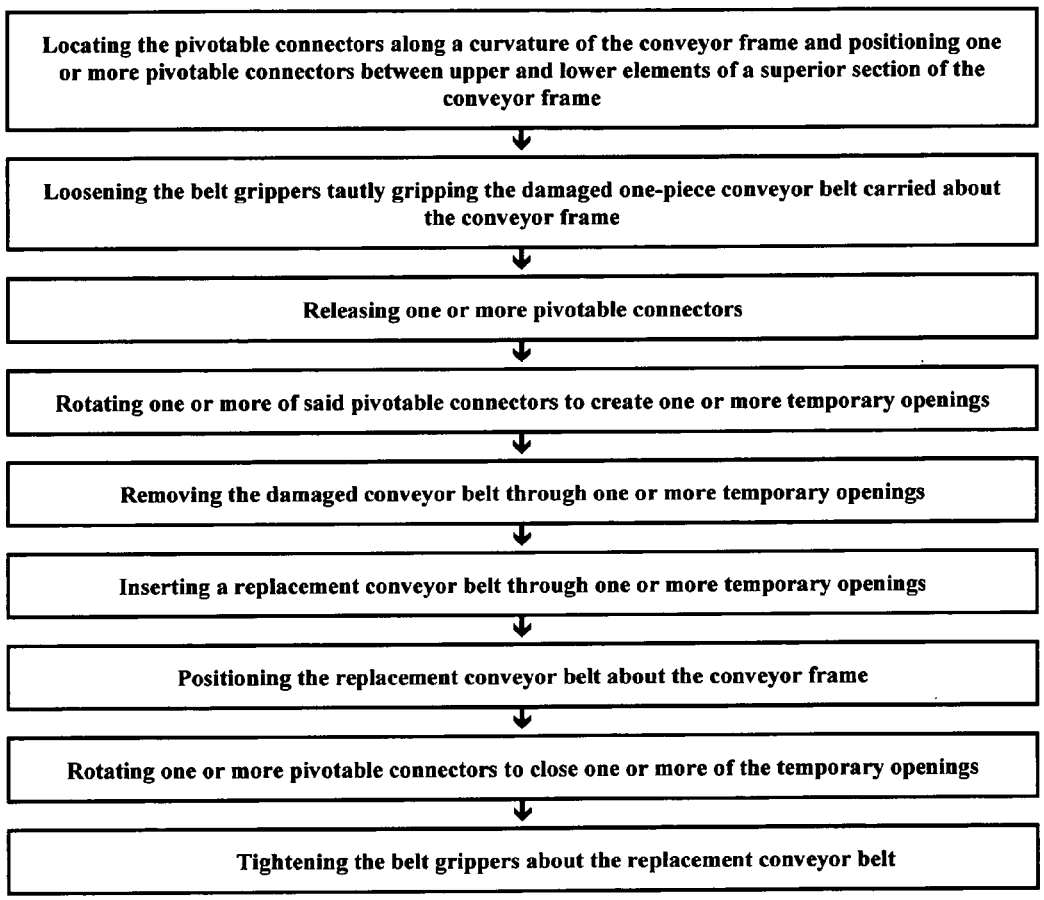
FIG. 9 is an exemplification of the steps of yet another embodiment of the current method.

Steps associated with the practice of the present invention and methods are set forth in FIGS. 7-9. Those steps are related to the practice of replacing a damaged conveyor belt with a replacement conveyor belt for the pivotable support structures previously set forth.

Having disclosed the invention as required by Title 35 of the United States Code, Applicants now pray respectfully that Letters Patent be granted for their invention in accordance with the scope of the claims appended hereto.

What is claimed is:

1. A curved conveyor, comprising:
   a) a plurality of legs;
   b) an outward curved member;
   c) an inward curved member;
   d) a plurality of cross members extending between said outward curved member and said inward curved member; said plurality of cross members further comprising upper and lower cross members;
   e) one or more pivotable links located between said upper and lower cross members, wherein each said pivotable link further comprises:
      i) a hub member, including an axle, mounted to a first cross member proximate said inward curved member;
      ii) a support connected with said axle; and
      iii) a securing member mounted to a second cross member proximate said inward curved member;
   f) a drive; and
   g) an endless conveyor belt.

2. The invention of claim 1 further comprising a conveyor bed.

3. The invention of claim 1 further comprising a fastener.

4. The invention of claim 3 wherein said securing member further comprises a plurality of apertures.

5. The invention of claim 4, wherein said fastener is a U-bolt and pin combination.

6. A pivotable support for a conveyor frame allowing easier removal of a damaged conveyor belt and positioning of a replacement conveyor belt about said conveyor frame, comprising:
   a) a first plate mounted about a first cross member of said conveyor frame; said first plate further comprising a shoulder;
   b) a second plate mounted about a second cross member of said conveyor frame; said second plate further comprising a hinge; and
   c) a connector pivotable about said hinge and capable of extending into said shoulder.

7. The invention of claim 6 further comprising a fastener.

8. The invention of claim 7, wherein said shoulder and said hinge are positioned between an upper cross member and a lower cross member said conveyor frame.

9. The invention of claim 8, wherein said pivotable support is a section of a conveyor leg.

10. A method of replacing a damaged seamless one-piece conveyor belt, comprising the steps of:
    a) loosening belt grippers tautly gripping said damaged seamless one-piece conveyor belt carried about a conveyor frame;
    b) releasing one or more pivotable connectors, wherein each said pivotable connector is extendable between a shoulder of a first plate mounted in proximity with a first cross member of said conveyor frame and a hinge of a second plate mounted in proximity with a second cross member of said conveyor frame;
    c) rotating said one or more of said pivotable connectors to create one or more temporary openings;
    d) removing said damaged seamless one-piece conveyor belt through said one or more temporary openings and away from said conveyor frame;
    e) inserting a replacement seamless one-piece conveyor belt through said one or more temporary openings;
    f) positioning said seamless one-piece replacement conveyor belt about said conveyor frame;
    g) rotating said one or more pivotable connectors to close one or more of said temporary openings; and
    h) tightening said belt grippers about said seamless one-piece replacement conveyor belt.

11. The method of claim 10 further comprising the step of positioning one or more of said pivotable connectors about a curvature of said conveyor frame.

12. A pivotable link for a conveyor frame allowing easier removal of a damaged conveyor belt and positioning of a replacement conveyor belt about said conveyor frame, comprising:
    a) a holder mounted to a superior section of said conveyor frame and positioned proximate a first cross member of said superior section, wherein said superior section further supports a drive, an endless belt and belt grippers;
    b) a hinge mounted to said superior section and positioned about a second cross member of said superior section; and
    c) a connector pivotable about said hinge.

13. The invention of claim 12 further comprising a fastener.

14. The invention of claim 13, wherein said fastener is a U-bolt and pin combination.

15. The invention of claim 14, wherein said pivotable link forms a section of a conveyor leg.

* * * * *